Dec. 2, 1969  H. R. WARREN  3,481,214
ASYNCHRONOUS DRIVE SYSTEM
Filed July 3, 1968
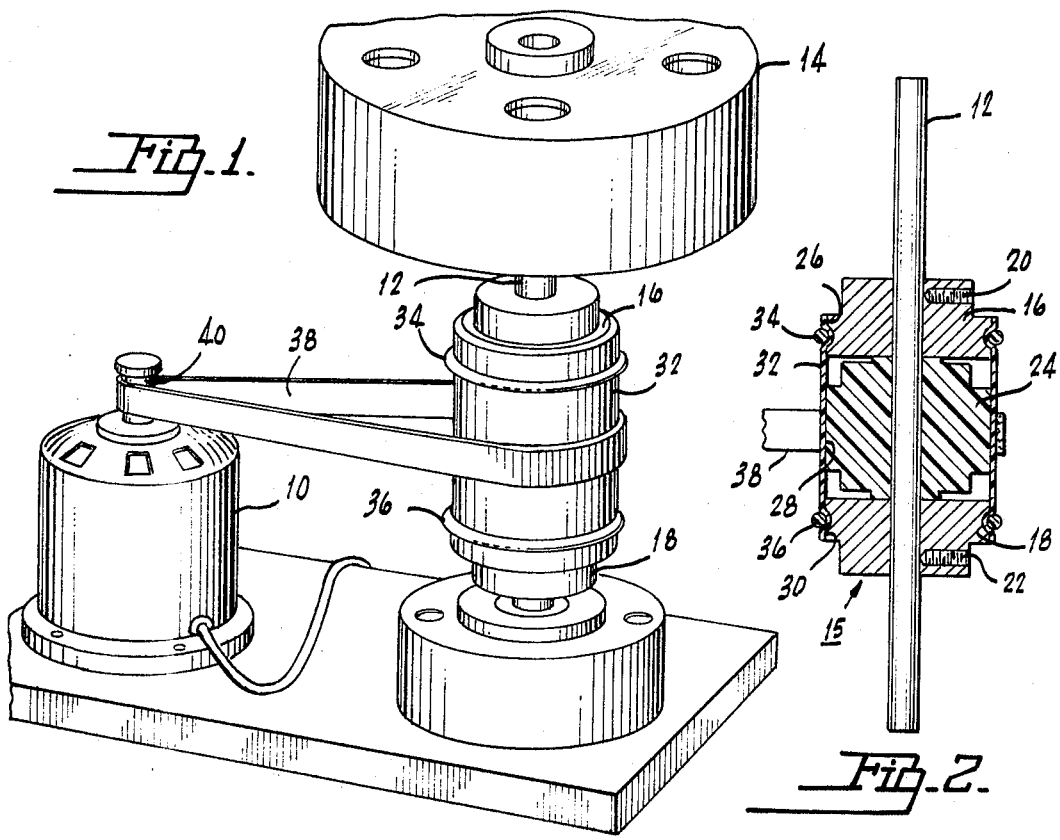
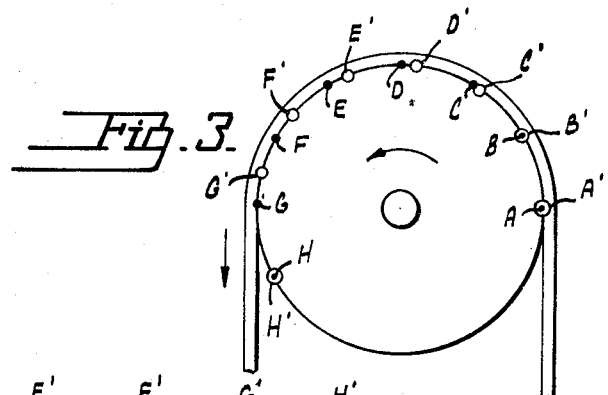
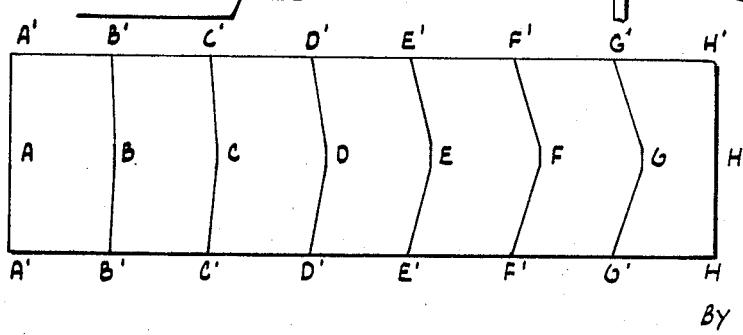
INVENTOR
HENRY RAY WARREN
BY Eugene M. Whitacre
ATTORNEY 3,481,214
ASYNCHRONOUS DRIVE SYSTEM
Henry Ray Warren, Indianapolis, Ind., assignor to RCA
Corporation, a corporation of Delaware
Filed July 3, 1968, Ser. No. 742,441
Int. Cl. F16h 9/26, 11/00, 55/46
U.S. Cl. 74—217                                                8 Claims

ABSTRACT OF THE DISCLOSURE

A pulley for coupling a driving shaft to a shaft which is driven asynchronously with respect to the driving shaft includes first and second juxtaposed cylindrical members on one of the shafts. The first cylindrical member is fixed to the shaft while the second is free to rotate relative to the shaft. An elastic sleeve which surrounds the second cylindrical member is affixed to the first member. A drive belt is adapted to engage the elastic sleeve.

---

This invention realtes to motorized drive systems and more particularly to a pulley and system for providing a variable speed coupling between a constant speed drive motor and a driven member.

In a motorized drive system where it is desirous to utilize a constant speed motor such as a synchronous motor as a drive source, it may be required that the driven member or members be phase locked to a frequency which has no correlation to the motor excitation frequency. Examples of this might be a variable speed drive coupling between a synchronous motor and the headwheel shaft, mandrel, or capstan in a video recorder. The speed or the driven member would then be said to be asynchronous with respect to the speed or angular velocity of the synchronous drive motor.

It is an object of the present invention to provide an asynchronous drive system.

It is another object of the present invention to provide means for asynchronously rotating a member from a constant speed drive source.

It is another object of the present invention to provide a variable speed coupling between a constant speed drive motor and the headwheel shaft in a video recorder.

In accordance with one embodiment of the present invention, an asynchronous drive of a shaft is provided by a belt coupling from a constant speed drive source to a pulley which includes an elastic sleeve surrounding a pair of cylindrical members in juxtaposition on said shaft. One of said cylindrical members is fixed to the shaft and said elastic sleeve while the other cylindrical member is free to rotate about said shaft with said belt coupling being to the portion of said pulley sleeve surrounding the other of said cylindrical members.

The novel features which are considered to be characteristic of the invention are set forth with particularity in the appended claims. The invention itself, however, both as to its organization and method of operation, as well as additional objects and advantages thereof will best be understood from the following description when read in connection with the accompanying drawing in which:

FIGURE 1 is a perspective view partially broken away of a belt drive system embodying the present invention;

FIGURE 2 is a sectional view in elevation of the driven pulley of the drive system of FIGURE 1; and FIGURES 3 and 4 are schematic diagrams which diagrammatically illustrate the stress or displacement of the elastic sleeve portion of the pulley upon contact with the drive belt.

Referring now to the drawing, a drive system embodying the present invention provides a variable speed coupling between a constant speed drive source, such as a synchronous motor 10, and a headwheel shaft 12 of a helical scan type video recorder. It is to be understood, however, that the invention is not so limited in use, but will find application in any drive system in which a constant velocity driving member drives an asynchronous member. In the embodiment shown, the shaft 12 supports and rotates with a mandrel 14 which during operation of the drive system is subjected to a torque load.

As shown more particularly in FIGURES 1 and 2, a pulley 15 includes two spaced apart cylindrical bushing members 16 and 18 which are fixedly secured to the shaft 12 by respective set screws 20 and 22. Freely mounted for rotation about the shaft 12 is an idler wheel or cylindrical member 24 concentric with and spaced between the bushing members 16 and 18. The major outside diameters of the cylindrical members 16, 24 and 18 are substantially equal so as to define three co-extensive cylindrical surfaces 26, 28 and 30. Also included in the pulley 15 is a sleeve member 32 surrounding the surfaces 26, 28 and 30. The sleeve 32 is fabricated of an elastic material such as natural rubber having a low internal damping. The elastic sleeve 32 provides a continuous sheath-like covering of the cylindrical surfaces 26, 28 and 30 and a means for coupling a rotative drive to the shaft 12 via the bushing members 16 and 18. The ends of the elastic sleeve 32 are held secured to and in fixed relation to the surfaces 26 and 30 of the bushing members 16 and 18 by means of respective retaining rings 34 and 36. The idler wheel 24, which is free to rotate about the shaft 12, provides a backing wall or support for the central portion of the sleeve 32. A continuous belt 38 connects an output shaft 40 of the synchronous drive motor 10 to the central portion of the elastic sleeve 32.

Operation of the drive system of the invention will now be described with particular reference now being made to FIGURES 3 and 4 of the drawing which diagrammatically indicate the stress or angular displacement imparted to the central portion of the elastic sleeve 32 in contact with the drive belt 38.

It may be assumed that the elastic sleeve 32 is made up of many axially oriented strips or rubber bands representing the central portion of the sleeve held together and extending between two annuli corresponding to the retaining rings 34 and 36 on the respective bushing members 16 and 18. The belt 38 is the driving member and the sleeve 32, the driven member. At point A, the belt 38 initially contacts one of the rubber band elements of the elastic sleeve 32. At this point A there is no tangential displacement of the band relative to the corresponding points A' at the fixed ends of the sleeve. Upon driven rotation of the sleeve, the central portion thereof is placed under a stress. Since the sleeve is formed of an elastic material, the contacted band element will be displaced in response to the stress an amount sufficient to maintain the driving speed of the belt constant. This displacement is shown at point B (FIGURES 3 and 4) relative to the non-displaced portions of the sleeve in fixed contact with the bushing members and indicated at point B'. As the band element progresses from point B, the angular displacement of the portion of the band element in contact with the belt increases until it reaches a maximum value at point G. At point H, the belt is no longer in contact with the rubber band element, and the band therefore relaxes to its unstressed state. It then remains in the unstressed state until it pases point A and again contacts the belt. The cycle then repeats. It can be seen that the greater the stretch of the belt contacted band element at point G relative to the unstretched state of the co-extensive portions of the band in fixed relationship with the bushings 16 and 18, the greater the speed difference between that of the belt 38, i.e., the input speed or speed of the drive source, and the output speed or speed of the shaft 12 driven by the unstressed portions of the band element in contact with the shaft carried bushing members 16 and 18. This stretch, and consequently the speed difference, is regulated by controlling the torque load on the output shaft 12. One such means of exercising this control is by an eddy current brake (not shown) coupled to the output shaft 12 via the mandrel 14.

While the amount of stretch or angular displacement of the elastic sleeve shown in FIGURES 3 and 4, has been exaggerated for illustration purposes, it has been found that on a 1 inch diameter pulley with a 180 degree belt wrap, the angular displacement is approximately 2.5 degrees or 0.021 inch of arc.

It will be noted that in practicing the present invention, means other than a belt may be employed to directly drive the pulley assembly; as for example, a driven wheel or cylinder in contact with a portion of the pulley elastic sleeve member.

Thus it will be seen that by means of the shaft and pulley assembly described and a constant speed drive coupling to an elastic sleeve portion thereof an asynchronous drive of said shaft relative to the constant speed drive has been provided.

What is claimed is:

1. A pulley assembly for coupling a driving shaft to a shaft which is to be driven asynchronously with respect to the driving shaft includes:

first and second cylindrical members in juxtaposition on one of said shafts, said first cylindrical member being fixed to said shaft and said second cylindrical member being free to rotate relative to said shaft; and an elastic sleeve surrounding said second cylindrical member and affixed to said first member.

2. A pulley assembly as defined in claim 1 in combination with:

drive means coupled to the other of said shafts and adapted to engage the elastic sleeve portion surrounding said first cylindrical member.

3. The combination as defined in claim 2 wherein said drive means includes a belt coupled between said other shaft and the elastic sleeve portion surrounding said first cylindrical member.

4. The combination as defined in claim 3 and further including a constant speed source drivingly coupled to said other shaft and wherein said other shaft corresponds to said driving shaft and said asynchronously driven shaft corresponds to said one shaft.

5. A pulley assembly as defined in claim 1 wherein said drive means includes a belt trained between said drive source and said elastic member.

6. A pulley assembly for coupling a constant speed drive source to a shaft which is to be driven asynchronously with respect to said drive source comprising:

a pair of spaced apart diametrically equal cylindrical bushing members supported on said shaft for rotation therewith;

a cylindrical idler member positioned between said bushing members and carried by said shaft for rotation thereabout the diameter of said idler member being substantially equal to the diameter of said bushing members; and an elastic sleeve surrounding said idler member and fixed to said bushing members, the portion thereof surrounding said idler member being adapted to couple to said constant speed drive source.

7. A pulley assembly as defined in claim 6 in combination with:

drive means coupled between said constant speed drive source and the portion of the elastic sleeve surrounding said idler member.

8. A system for asynchronously driving a shaft subjected to a varying torque load comprising:

a driven pulley assembly including a pair of spaced apart diametrically equal cylindrical bushing members supported on said shaft for rotation therewith, an idler wheel positioned between said bushing members and carried by said shaft for rotation thereabout, the diameter of said wheel being substantially equal to the diameter of said bushings, and elastic means providing a sleeve covering of the outer cylindrical wall surfaces of said idler wheel and bushing members and being in a fixed relationship with said bushing members for rotation therewith;

means providing a constant speed drive source; and means coupling said constant speed drive source to said elastic means such that the portion of said elastic means covering said idler wheel is caused to be stressed relative to the portion covering said bushing members upon a contact with said coupling means so as to maintain a constant speed coupling with said drive source, and then returned to its unstressed stage when said contact is released, thereby to provide a difference in the speed of the drive imparted to the bushing members of said driven assembly relative to the speed of the stressed portion of said elastic means.

References Cited

UNITED STATES PATENTS 886,998   5/1908   Love _____ 74—230.3 XR

FRED C. MATTERN, JR., Primary Examiner

J. A. WONG, Assistant Examiner

U.S. Cl. X.R.

74—230.3, 230.7